(12) United States Patent
Krahn (10) Patent No.: US 9,692,599 B1
(45) Date of Patent: Jun. 27, 2017

(54) SECURITY MODULE ENDORSEMENT (71) Applicant: Google Inc., Mountain View, CA (US)

(72) Inventor: Darren Krahn, Saratoga, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 14/488,206

(22) Filed: Sep. 16, 2014

(51) Int. Cl.
G06F 21/57 (2013.01)
H04L 9/32 (2006.01)

(52) U.S. Cl.
CPC ............ *H04L 9/3247* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 7,263,608 B2 | 8/2007 | Challener et al. | |
| 7,644,278 B2 | 1/2010 | Catherman et al. | |
| 8,065,522 B2 | 11/2011 | Bade et al. | |
| 8,108,668 B2 | 1/2012 | Rozas | |
| 8,122,514 B2 | 2/2012 | Ellison et al. | |
| 8,549,592 B2 | 10/2013 | Bade et al. | |
| 8,608,057 B1* | 12/2013 | Crews | G06F 21/57 235/379 |
| 2005/0120219 A1* | 6/2005 | Munetoh | G06F 21/52 713/176 |
| 2005/0149729 A1* | 7/2005 | Zimmer | G06F 21/575 713/168 |
| 2005/0283601 A1* | 12/2005 | Tahan | G06F 21/575 713/2 |
| 2006/0074600 A1* | 4/2006 | Sastry | G06F 21/57 702/187 |
| 2007/0016766 A1* | 1/2007 | Richmond | G06F 21/57 713/100 |
| 2007/0094719 A1* | 4/2007 | Scarlata | G06F 21/53 726/9 |
| 2007/0143629 A1* | 6/2007 | Hardjono | H04L 63/0823 713/189 |
| 2007/0226505 A1* | 9/2007 | Brickell | G06F 21/57 713/176 |
| 2008/0126779 A1* | 5/2008 | Smith | G06F 21/575 713/2 |
| 2008/0141027 A1* | 6/2008 | Kim | H04L 9/3218 713/156 |

(Continued)

Primary Examiner — Trang Doan
(74) Attorney, Agent, or Firm — McDermott Will & Emery LLP (57) ABSTRACT Techniques for security module endorsement are provided. An example method includes receiving a generalized endorsement key at a security module, wherein the security module is associated with a computing device and wherein the generalized endorsement key is independent of characteristics of the computing device, automatically extending integrity measurements stored in one or more registers of the security module with information characterizing the computing device, wherein the integrity measurements are based on one or more software processes at the computing device, digitally signing the extended integrity measurements with a digital signature, and generating a specialized endorsement credential as a combination of the digitally signed extended integrity measurements, the digital signature and the generalized endorsement key, wherein the specialized endorsement credential is used to validate authenticity of the security module.

17 Claims, 4 Drawing Sheets (56) References Cited

U.S. PATENT DOCUMENTS

| | | | | |
|---|---|---|---|---|
| 2008/0288783 A1* | 11/2008 | Jansen | ............... | G06F 21/57 713/189 |
| 2008/0301457 A1* | 12/2008 | Uesugi | ............... | G06F 21/645 713/178 |
| 2008/0307223 A1* | 12/2008 | Brickell | ............... | H04L 63/126 713/158 |
| 2009/0172781 A1* | 7/2009 | Masuoka | ............... | H04L 63/105 726/3 |
| 2009/0204806 A1* | 8/2009 | Kanemura | ............... | G06F 21/10 713/155 |
| 2009/0271637 A1* | 10/2009 | Takekawa | ............... | G06F 21/552 713/189 |
| 2010/0082991 A1* | 4/2010 | Baldwin | ............... | H04L 9/083 713/176 |
| 2010/0115625 A1* | 5/2010 | Proudler | ............... | G06F 21/445 726/27 |
| 2010/0161998 A1* | 6/2010 | Chen | ............... | G06F 21/57 713/189 |
| 2010/0169667 A1* | 7/2010 | Dewan | ............... | G06F 21/57 713/193 |
| 2011/0040961 A1* | 2/2011 | Badaoui-Najjar | ............... | G06F 21/57 713/2 |
| 2012/0023568 A1* | 1/2012 | Cha | ............... | G06F 21/335 726/10 |
| 2013/0061056 A1* | 3/2013 | Proudler | ............... | G06F 21/57 713/176 |
| 2014/0032920 A1* | 1/2014 | Gehrmann | ............... | G06F 21/57 713/176 |
| 2014/0089660 A1* | 3/2014 | Sarangshar | ............... | H04L 9/3234 713/156 |
| 2014/0095886 A1* | 4/2014 | Futral | ............... | G06F 21/572 713/187 |
| 2015/0271139 A1* | 9/2015 | Lukacs | ............... | H04L 63/0209 726/11 |

\* cited by examiner

SECURITY MODULE ENDORSEMENT

BACKGROUND

The present disclosure relates generally to security modules particularly to use of such modules in trusted computing. An example of a security module is a Trusted Platform Module, or TPM.

SUMMARY

The disclosed subject matter relates to security module endorsement.

In some innovative implementations, the disclosed subject matter can be embodied in a method. The method comprises receiving a generalized endorsement key at a security module, where the security module is associated with a computing device and where the generalized endorsement key is independent of characteristics of the computing device, automatically extending integrity measurements stored in one or more registers of the security module with information characterizing the computing device, where the integrity measurements are based on one or more software processes at the computing device, digitally signing the extended integrity measurements with a digital signature, and generating a specialized endorsement credential as a combination of the digitally signed extended integrity measurements, the digital signature and the generalized endorsement key, where the specialized endorsement credential is used to validate authenticity of the security module.

In some innovative implementations, the disclosed subject matter can be embodied in a machine readable medium. The machine readable medium includes instructions, which when executed by a processor, cause the processor to perform operations comprising receiving, from a security module associated with a computing device in a request for an attestation identity credential, a specialized endorsement credential, where the specialized endorsement credential is generated by automatically extending integrity measurements stored in one or more registers of the security module with information characterizing the computing device, where the integrity measurements are based on one or more software processes at the computing device, determining whether one or more extended integrity measurements in the specialized endorsement are valid, when the one or more extended integrity measurements in the specialized endorsement are valid, generating the attestation identity credential, and providing the generated attestation identity credential to the security module to validate that the specialized endorsement credential is bound to an authentic security module.

In some innovative implementations, the disclosed subject matter can be embodied in a system. The system comprises a memory comprising instructions and a processor configured to execute the instructions to receive a generalized endorsement key at a security module, where the security module is associated with a computing device and where the generalized endorsement key is independent of characteristics of the computing device, modify integrity measurements stored in one or more registers of the security module with information characterizing the computing device, where the integrity measurements are based on one or more software processes at the computing device, digitally sign the modified integrity measurements with a digital signature, and generate a specialized endorsement credential as a combination of the digitally signed modified integrity measurements, the digital signature and the generalized endorsement key, where the specialized endorsement credential is used to validate authenticity of the security module.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

A trusted platform can be a computing platform that has a trusted component, in the form of a security module, which the trusted platform uses to create a foundation of trust for software processes. An example of such a security module is a Trusted Platform Module, or TPM. The TPM is typically implemented as a tamper resistant integrated circuit (IC) on a computing device. The TPM may be associated with firmware (e.g., Basic Input/Output System (BIOS) firmware) that allows the computing device to represent itself as a trusted platform.

Endorsement of legitimacy of a computing device including a security module (e.g., a TPM) typically involves an endorsement authority embedding an endorsement key (e.g., software certification such as an asymmetric key pair and a certificate for the corresponding public key) in the security module at the time of manufacture. In some cases, the endorsement key may include coarse information regarding a manufacturer of the computing device or the security module. In other cases, the endorsement key may include information regarding a type of a product (e.g., laptop or cell-phone). However, it may be infeasible for an endorsement authority to be aware of numerous classes, models, or manufacturing batches of products and include such information in each endorsement correctly. This is especially a problem when the endorsement is of a particular part (e.g., a TPM module) and that particular part is distributed widely for inclusion in different devices.

The disclosed embodiments allow an endorsement authority to provide a generalized endorsement key to a security module, where the security module is associated with a computing device and where the generalized endorsement key is independent of characteristics of the computing device. Information characterizing the computing device can be automatically read by a firmware component of the computing device from secure storage associated with the security module. The information may include, for example, a model of the device and a hardware identification of the device. Integrity measurements (e.g., hashes of values representing software processes), that are based on one or more software processes at the computing device and stored in one or more registers (e.g., platform control registers (PCRs)) of the security module, can then be extended or modified with the information characterizing the computing device. The firmware component digitally signs the extended integrity measurements with a digital signature. A specialized endorsement credential can then be generated as a combination of the digitally signed extended integrity measurements, the digital signature and the generalized endorsement key.

In this way, a specialized endorsement credential can be automatically generated (e.g., generated upon receipt of a generalized endorsement key) where the specialized endorsement credential includes one or more of a model, hardware identification or batch of the computing device. The specialized endorsement credential can be used to more specifically endorse the security module relative to the generalized endorsement key. In some implementations, the specialized endorsement credential may be provided to a certificate authority server in a request for an attestation identity credential needed by the computing device on which the security module resides to validate that the specialized endorsement credential is bound to an authentic security module. At the certificate authority server, it may be determined whether one or more extended integrity measurements in the specialized endorsement credential are valid. The validity may be determined based on a comparison of the extended integrity measurements to one or more stored valid extended integrity measurements. When the one or more extended integrity measurements in the specialized endorsement credential are valid, the certificate authority server may generate and provide the requested attestation identity credential to the security module validating that the specialized endorsement credential is bound to an authentic security module. When the security module is authenticated, the security module may be trusted and used by software processes on the computing device to, for example, store passwords, digital credentials, sensitive data and any other data associated with the software processes. The one or more stored valid extended integrity measurements may be changed to control provision of attestation identity credentials to certain classes, models, or batches of the computing device.

Some aspects of the subject technology include storing information regarding computing device hardware. A user has the option of preventing storage of such information. The user may also be provided with an opportunity to control whether programs or features collect or share such information. Thus, the user may have control over how information is collected about the computing device hardware and used by a server.

Figure 1:
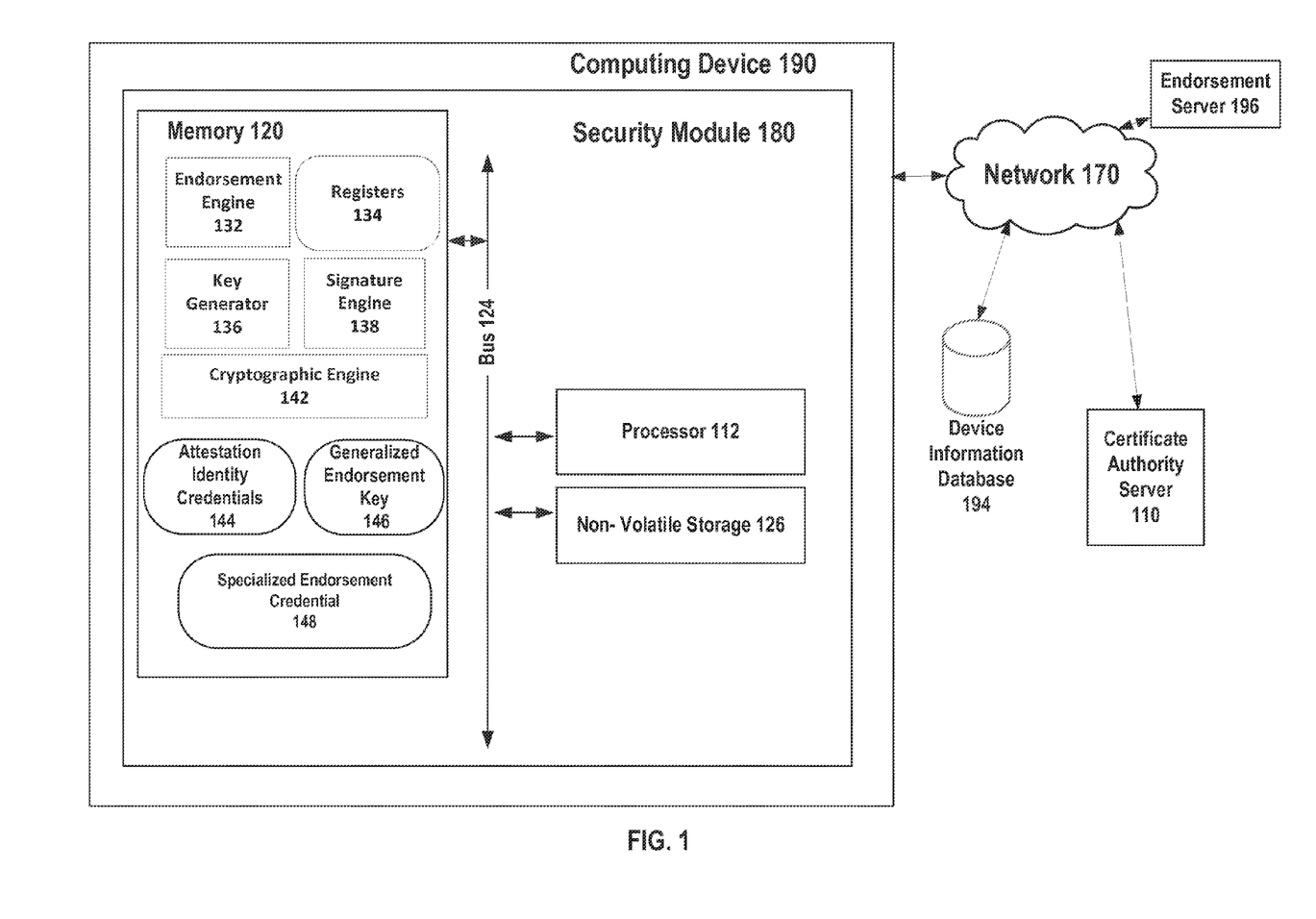
FIG. 1 is a diagram of an example device and network environment suitable for practicing some implementations of the subject technology.

FIG. 1 is a diagram illustrating example architecture for security module endorsement according to some implementations of the subject technology. Security module 180 includes processor 112, memory 120, storage 126 and bus 124. Security module 180 may also be associated with an input/output module, input device, output device and a communications module. Memory 120 includes endorsement engine 132, registers 134, key generator 136, signature engine 138 and cryptographic engine 142. Memory 120 may also store attestation identity credentials 144, generalized endorsement key 146 and specialized endorsement credential 148.

Security module 180 may reside in computing device 190. Computing device 190 may include one or more processors, memory and storage. Computing device 190 may additionally include an output device (e.g., touch screen display, non-touch screen display), input device (e.g., a keyboard, touchscreen, or mouse) to receive user input. In some implementations, computing device 190 may include one or more modules for facilitating user interaction with via a browser or a special purpose application executing on computing device 190. Computing device 190 may be implemented as a single machine with a single processor, a multi-processor machine, or a server farm including multiple machines with multiple processors. A communication module on computing device 190 can allow security module 180 (or computing device 190) to send and receive data over network 150 to device information database 194, endorsement server 196 and certificate authority server 110.

In some implementations, security module 180 may be associated with a device information database 194. Device information database 194 may include data identifying devices and characteristics of the devices. Identification may be a number, alphanumeric string, hash value or any other form of identification. The devices may include, but are not limited to, laptops, mobile devices, tablet computers, home automation devices and sensors, Internet enabled hardware devices, etc. The characteristics may include, but are not limited to, classes, models, or batches of devices that may be manufactured by different manufacturers. In some implementations, the devices and their respective characteristics may be associated with respective specialized endorsement credentials and extended integrity measurements. In some implementations, this information may be stored in a database table at device information database 194 and may be indexed by specialized endorsement credentials.

In some implementations, device information database 194 may identify (e.g., flag) specialized endorsement credentials and respective extended integrity measurements devices that are invalid. Security modules (e.g., security module 180) that provide such invalid credentials are not to be provided with attestation identity credentials that would attest or confirm authenticity of the security modules and thereby authenticity of computing devices on which the security modules reside. Similarly, in some implementations, device information database 194 may identify specialized endorsement credentials and respective extended integrity measurements that are valid. Security modules (e.g., security module 180) that provide such invalid credentials are to be provided with attestation identity credentials that would attest or confirm authenticity of the security modules and thus authenticity of computing devices on which the security modules reside. In some implementations, the one or more specialized endorsement credentials that are identified to be valid (or invalid) may be changed at device information database 194 by certificate authority server 110 to control provision of credential certificates to certain classes, models, or batches of computing device 190.

In some implementations, certificate authority server 110, device information database 194, endorsement server 196, client computing device 190 and security module 180 can communicate with one another via a network 150. Network 150 may include the Internet, an intranet, a local area network, a wide area network, a wired network, a wireless network, or a virtual private network (VPN). While only one certificate authority server 110, endorsement server 196, computing device 190, device information database 194 and security module 180 are illustrated, the subject technology may be implemented in conjunction with any number of certificate authority servers 110, client computing devices 190, device information databases 194 and security modules 180. In some non-limiting implementations, a single computing device may implement the functions of certificate authority server 110 and device information database 194 other components illustrated in FIG. 1.

Client computing device 190 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 may each include one or more of a keyboard, a mouse, a display, or a touch screen. Client computing device 190 can each include a web application configured to display web content. Alternatively, client computing device 190 may include special-purpose applications (e.g., mobile phone or tablet computer applications) for accessing web content. Security module 180 may be embedded in computing device 190 during manufacture of computing device 190.

As discussed above, memory 120 of security module 180 can include endorsement engine 132, registers 134, key generator 136, signature engine 138, and cryptographic engine 142. Memory 120 may also store attestation identity credentials 144, generalized endorsement key 146 and specialized endorsement credential 148. In some implementations, endorsement engine 132 may receive a generalized endorsement key. The generalized endorsement key may be provided by a manufacturer of the security module associated with the computing device 190. The generalized endorsement key may be independent of characteristics of the computing device (e.g., device name or model etc.). The generalized endorsement key may be a number, alphanumeric string, hash value or any other form of digital key.

In some implementations, during a boot process, security module 180 may measure (e.g., generate hashes) of one or more software and firmware components, including a BIOS, boot loader, and operating system kernel of computing device 190, before they are loaded into memory of computing device 190. By making these integrity measurements before the software and firmware components execute and storing them on security module 180, the measurements may be isolated and secured from subsequent modification attempts. The integrity measurements may be stored by security module 180 in registers 134. In some implementations, key generator 136 may automatically extend or modify integrity measurements stored in one or more registers 134 of security module 180 with information characterizing computing device 190. As an example, the automatic extension or modification may be performed upon a hardware boot operation of the computing device 190, at preconfigured intervals or upon storage of the integrity measurements in registers 134. The integrity measurements that are to be extended can be based on one or more software processes at the computing device 190. In some implementations, the extending can be performed by key generator 136 at each hardware boot cycle of computing device 190.

In some implementations, the information characterizing computing device 190 can include a hardware identifier. The hardware identifier may identify one or more of a batch, model or class of the computing device. The hardware identification may be a number, alphanumeric string, hash value or any other form of identification. The hardware identifier may be stored in secure storage (e.g., storage 126) during manufacture of computing device 190. The secure storage can be for example, a non-volatile random access memory (NVRAM) index. In some implementations, access to the secure storage is based on one or more of a cryptographic key or a present operational state of the computing device 190.

In some implementations, signature engine 138 may digitally sign the extended integrity measurements with a digital signature. In some implementations, the digital signature may be a hash or cryptographic value generated by cryptographic engine 142. In some implementations, endorsement engine 132 may generate a specialized endorsement credential 148 as a combination of the digitally signed extended integrity measurements, the digital signature and the generalized endorsement key. As an illustrative example, the combination may include one or more of appending the digitally signed extended integrity measurements, the digital signature and the generalized endorsement key or generating a hash value based on the digitally signed extended integrity measurements, the digital signature and the generalized endorsement key. This example is illustrative and is not intended to limit the disclosed implementations. In some implementations, the generalized endorsement key may not be extracted or retrieved from security module 180. In some implementations, a generalized endorsement credential, which may be a digital certificate for the generalized endorsement key, can be sent as part of the specialized endorsement to certificate authority server 110. As an example, the digital certificate may be injected by endorsement engine 132 with the generalized endorsement key. In some implementations, only the digital certificate may be read later (e.g., read by certificate authority server 110). Specialized endorsement credential 148 may be used to validate authenticity of security module 180 as discussed below.

In some implementations, endorsement engine 132 can provide, in a request for an attestation identity credential, specialized endorsement credential 148 to a certificate authority server 110, and receive, from certificate authority server 110, attestation identity credential 144. Receipt of attestation identity credential 144 can indicate to security module 180 and computing device 190 that the corresponding specialized endorsement credential 148 is bound to an authentic security module (e.g., security module 180).

In some implementations, specialized endorsement credential 148 may be provided to certificate authority server 110 in a request for an attestation identity credential needed by security module 180 (or computing device on which the security module resides). Certificate authority server 110 may determine whether one or more extended integrity measurements in specialized endorsement 148 are valid. The validity may be determined by certificate authority server 110 based on a comparison of the extended integrity measurements to one or more valid extended integrity measurements stored at device information database 194.

In some implementations, to determine the validity of the specialized endorsement credential received from security module 180, certificate authority server 110 may communicate with device information database 194. Certificate authority server 110 compare the extended integrity measurements to one or more valid extended integrity measurements in valid specialized endorsement credentials stored at the device information database 194. When the one or more extended integrity measurements in the specialized endorsement are valid the certificate authority server 110 may generate and provide attestation identity credential 144 to security module 180. Receipt of attestation identity credential 144 at security module 180 can validate that the specialized endorsement credential 148 is bound to an authentic security module or that security module 180 is authentic. Otherwise, the requested attestation identity credential 144 may not be provided by the certificate authority server 110 to security module 180 indicating that the specialized endorsement credential 148 is not bound to an authentic security module or that security module 180 may not be authentic.

In some implementations, endorsement server 196 or another server may provide instructions to device information database 194 to invalidate one or more stored valid extended integrity measurements to control provision of attestation identity credentials to certain classes, models, or batches of computing device 190. For example, when it is known that certain classes, models, or batches of computing device 190 are susceptible to malware or malicious software processes, certificate authority server 110 may invalidate one or more stored valid extended integrity measurements associated with such classes, models, or batches of computing device 190. As a result, certificate authority server 110 may no longer provide attestation identity credentials to such computing devices to validate authenticity of their respective security modules. When a security module is not authenticated, the security module may be not trusted and used by software processes on the computing device to, for example, store passwords, digital credentials, sensitive data and any other data associated with the software processes. In other words, a computing device associated with the inauthentic security module may no longer be trusted by software processes on the computing device as well as by other third-party software processes and components.

In some implementations, endorsement server 196 or another server may provide instructions to device information database 194 to validate one or more stored extended integrity measurements to control provision of attestation identity credentials to certain classes, models, or batches of computing device 190. For example, when it is known that certain classes, models, or batches of computing device 190 are no longer susceptible to malware or malicious software processes, certificate authority server 110 may validate one or more stored valid extended integrity measurements associated with such classes, models, or batches of computing device 190. As a result, certificate authority server 110 may provide attestation identity credentials to such computing devices to validate authenticity of their respective security modules. When a security module is authenticated, the security module may be trusted and used by software processes on the computing device to, for example, store passwords, digital credentials, sensitive data and any other data associated with the software processes. In other words, a computing device associated with an authentic security module may be trusted by software processes on the computing device as well as by other third-party software processes and components.

Figure 2:
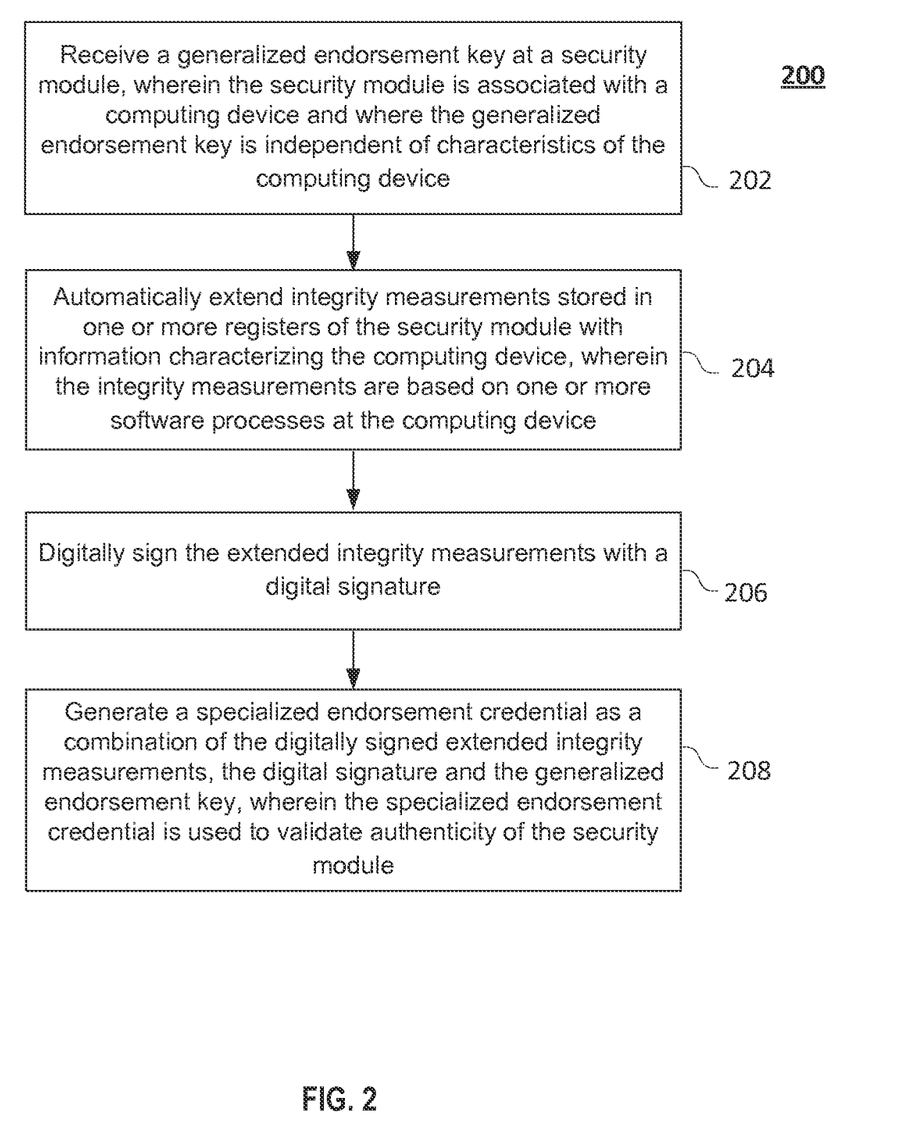
FIG. 2 is an example process for practicing implementations of the subject technology using the example device of FIG. 1

FIG. 2 is an example process 200 for practicing implementations of the subject technology using the example architecture of FIG. 1. Although FIG. 2 is described with reference to the elements of FIG. 1, the process of FIG. 2 is not limited to such and can be applied within other systems.

Process 200 begins with receiving a generalized endorsement key at a security module (block 202). The security module can be associated with a computing device and where the generalized endorsement key can be independent of characteristics of the computing device. As an example, generalized endorsement key 146 may be received at security module 180. In some implementations, endorsement engine 132 may receive generalized endorsement key 146. Generalized endorsement key 146 may be provided by a manufacturer of security module 180. The generalized endorsement key may be independent of characteristics of the computing device (e.g., device name or model etc.).

Process 200 proceeds by automatically extending integrity measurements stored in one or more registers of the security module with information characterizing the computing device (block 204). The integrity measurements can be based on one or more software processes at the computing device. As an example, endorsement engine 132 may automatically modify or extend integrity measurements stored in one or more registers 134 of security module 180 with information characterizing computing device 190. In some implementations, the information characterizing computing device 190 can include a hardware identifier. The hardware identifier may identify one or more of a batch, model or class of the computing device. The hardware identification may be a number, alphanumeric string, hash value or any other form of identification. The hardware identifier may be stored in secure storage (e.g., storage 126) during manufacture of computing device 190.

The extended integrity measurements can be signed with a digital signature (block 206). As an example, the extended integrity measurements may be digitally signed by signature engine 138. The digital signature may be a hash or cryptographic value generated by cryptographic engine 142.

A specialized endorsement credential can be generated as a combination of the digitally signed extended integrity measurements, the digital signature and the generalized endorsement key (block 208). The combination may include, for example, appending the digitally signed extended integrity measurements, the digital signature and generalized endorsement key 146 or generating a hash value based on the digitally signed extended integrity measurements, the digital signature and generalized endorsement key 146. These examples are illustrative and are not intended to limit the disclosed implementations.

The specialized endorsement credential 148 may be used to validate authenticity of security module 180. For example, endorsement engine 132 can provide, in a request for an attestation identity credential, specialized endorsement credential 148 to certificate authority server 110, and receive, from certificate authority server 110, attestation identity credential 144. Attestation identity credential 144 can indicate that the corresponding specialized endorsement credential is bound to an authentic security module (e.g., security module 180). When the security module is authenticated, the security module may be trusted and used by software processes on the computing device to, for example, store passwords, digital credentials, sensitive data and any other data associated with the software processes.

Figure 3:
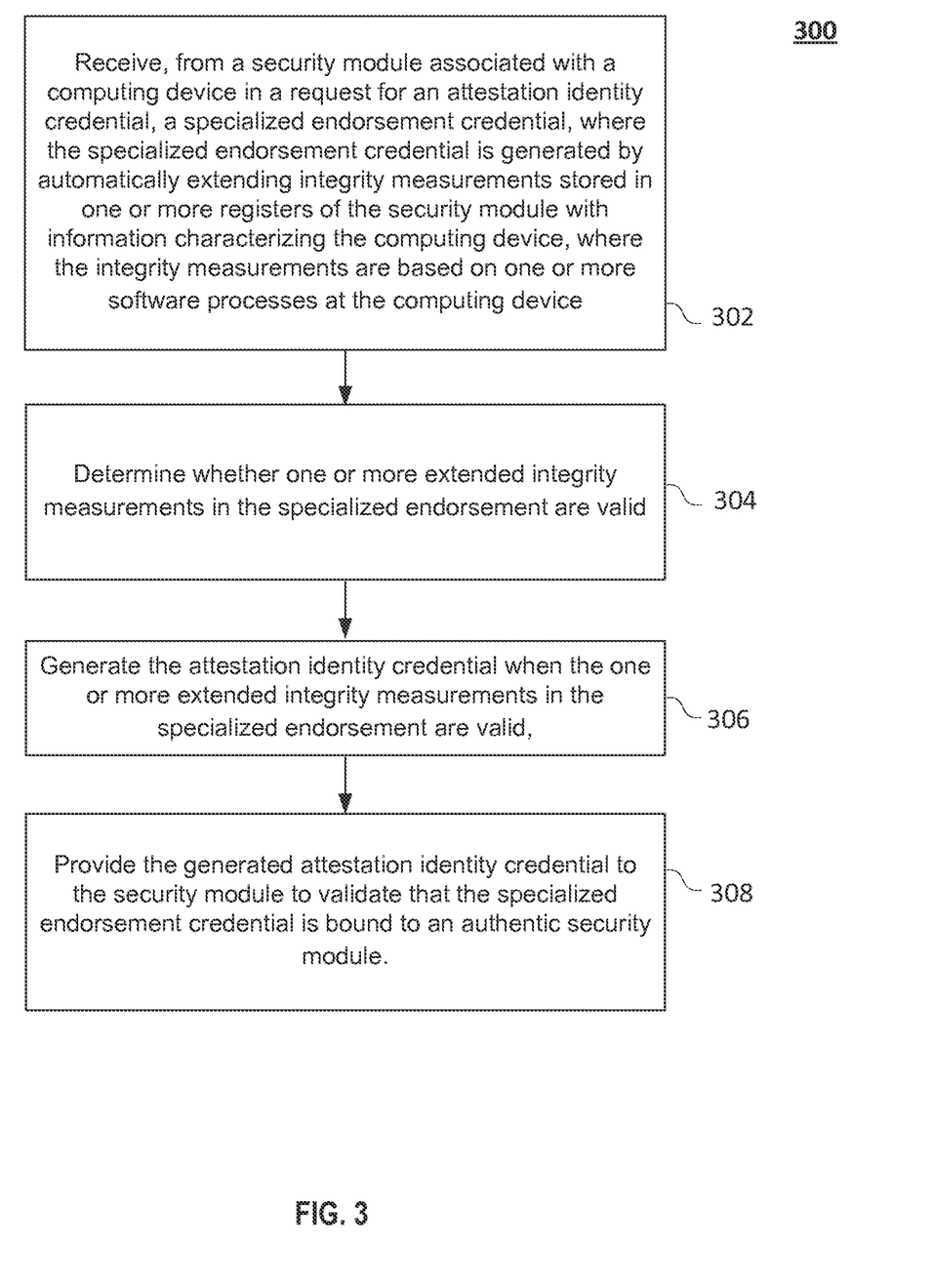
FIG. 3 illustrates another example process for practicing implementations of the subject technology using the example device of FIG. 1.

FIG. 3 is an example process 300 for practicing implementations of the subject technology using the example architecture of FIG. 1. Although FIG. 3 is described with reference to the elements of FIG. 1, the process of FIG. 3 is not limited to such and can be applied within other systems.

Process 300 begins with receiving, from a security module associated with a computing device in a request for an attestation identity credential, a specialized endorsement credential (block 302). The specialized endorsement credential can be generated by the computing device by automatically extending integrity measurements stored in one or more registers of the security module with information characterizing the computing device, where the integrity measurements are based on one or more software processes at the computing device. As an example, certificate authority server 110 may receive in a request for an attestation identity credential from security module 180 associated with computing device 190, specialized endorsement credential 148. Specialized endorsement credential 148 can be generated by computing device 190 by automatically extending integrity measurements stored in registers 134 of security module 180 with information characterizing computing device 190. The integrity measurements can be based on one or more software processes at computing device 190.

Process 300 proceeds by determining whether one or more extended integrity measurements in the specialized endorsement are valid (block 304). As an example, the validity may be determined by certificate authority server 110 based on a comparison of the extended integrity measurements to one or more valid extended integrity measurements stored at device information database 194.

When the one or more extended integrity measurements in the specialized endorsement are valid, an attestation identity credential can be generated (block 306). For example, certificate authority server 110 may generate an attestation identity credential. The generated attestation identity credential may be provided to the security module to validate that the specialized endorsement credential is bound to an authentic security module. For example, attestation identity credential 144 may be provided to security module 180 to validate that the specialized endorsement credential 148 is bound to an authentic security module (e.g., security module 180).

Figure 4:
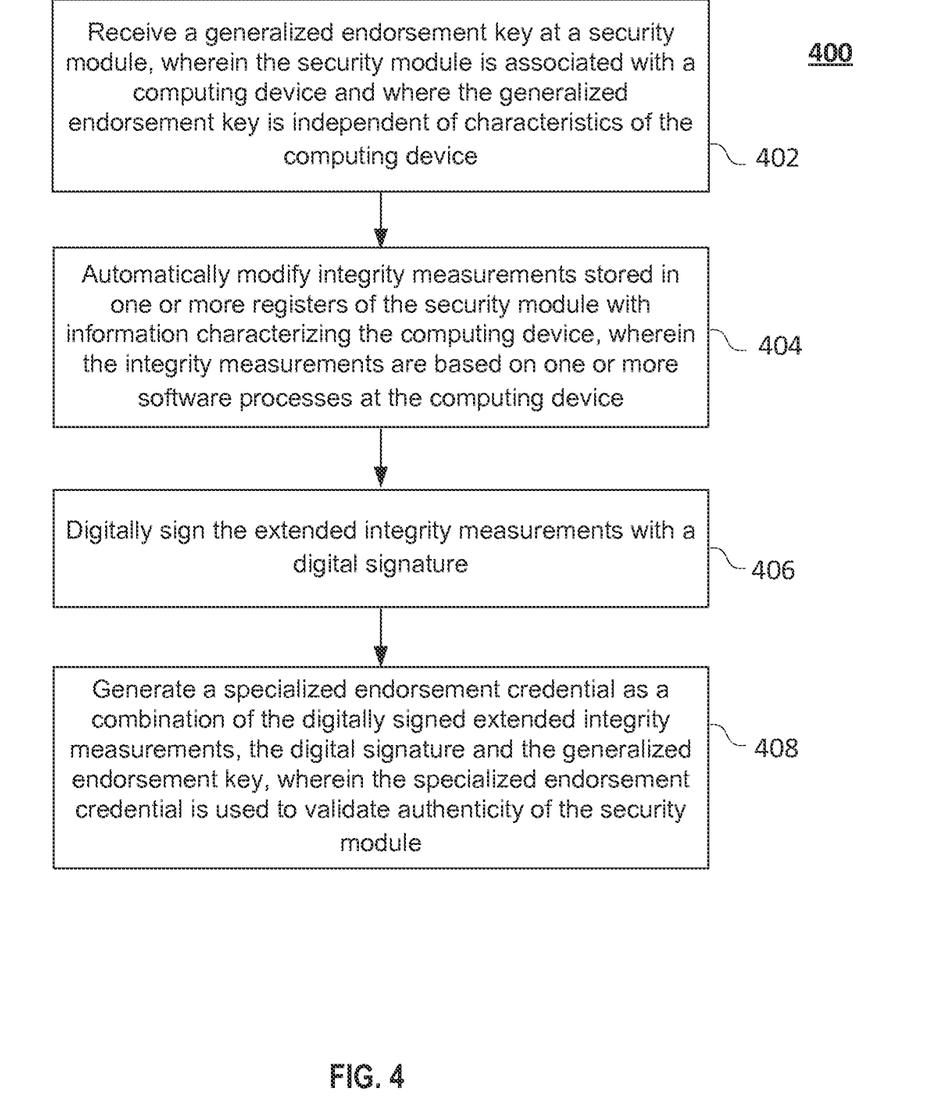
FIG. 4 illustrates yet another example process for practicing implementations of the subject technology using the example device of FIG. 1.

FIG. 4 is an example process 400 for practicing implementations of the subject technology using the example device of FIG. 1. Although FIG. 4 is described with reference to the elements of FIG. 1, the process of FIG. 4 is not limited to such and can be applied within other systems.

Process 400 begins with receiving a generalized endorsement key at a security module, where the security module is associated with a computing device and wherein the generalized endorsement key is independent of characteristics of the computing device (block 402). As an example, generalized endorsement key 146 may be received at security module 180. In some implementations, endorsement engine 132 may receive generalized endorsement key 146. Generalized endorsement key 146 may be provided by a manufacturer of security module 180 associated with the computing device 190. The generalized endorsement key may be independent of characteristics of the computing device (e.g., device name or model etc.).

Process 400 proceeds by modifying integrity measurements stored in one or more registers of the security module with information characterizing the computing device, where the integrity measurements are based on one or more software processes at the computing device (block 404). As an example, endorsement engine 132 may automatically modify or extend integrity measurements stored in one or more registers 134 of security module 180 with information characterizing computing device 190. In some implementations, the information characterizing computing device 190 can include a hardware identifier. The hardware identifier may identify one or more of a batch, model or class of the computing device. The hardware identification may be a number, alphanumeric string, hash value or any other form of identification. The hardware identifier may be stored in secure storage (e.g., storage 126) during manufacture of computing device 190.

The extended integrity measurements can be signed with a digital signature (block 406). As an example, the extended integrity measurements may be digitally signed by signature engine 138. The digital signature may be a hash or cryptographic value generated by cryptographic engine 142.

A specialized endorsement credential can be generated as a combination of the digitally signed extended integrity measurements, the digital signature and the generalized endorsement key (block 408). The combination may include, for example, one or more of appending the digitally signed extended integrity measurements, the digital signature and generalized endorsement key 146 or generating a hash value based on the digitally signed extended integrity measurements, the digital signature and generalized endorsement key 146. This example is illustrative and is not intended to limit the disclosed implementations. The specialized endorsement credential 148 may be used to validate authenticity of security module 180. For example, endorsement engine 132 can provide, in a request for an attestation identity credential, specialized endorsement credential 148 to a certificate authority, and receive, from certificate authority 110, the attestation identity credential 144. The attestation identity credential 144 can indicate that the corresponding specialized endorsement credential is bound to an authentic security module (e.g., security module 180). When the security module is authenticated, the security module may be trusted and used by software processes on the computing device to, for example, store passwords, digital credentials, sensitive data and any other data associated with the software processes.

Returning to FIG. 1, in certain aspects, security module 180 may be implemented using hardware or a combination of software and hardware, either in a dedicated server, computing device or integrated into another entity, or distributed across multiple entities.

Security module 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Security module 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, security module 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Security module 180 further includes a data storage device 126 such as a magnetic disk or optical disk, solid state memory, non-volatile memory, etc. coupled to bus 124 for storing information and instructions. Client 190 may be coupled via an input/output module to various devices. The input/output module can be any input/output module. Example input/output modules include data ports such as USB ports. The input/output module can be configured to connect to a communications module. Example communications modules include networking interface cards, such as Ethernet cards and modems. In certain aspects, the input/output module is configured to connect to a plurality of devices, such as an input device and/or an output device. Example input devices include a keyboard and a pointing device, e.g., a mouse or a trackball, by which a user can provide input to the client computing device 190 and security module 180. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, security module 180 can be implemented in client computing device 190 in response to processor 112 executing one or more sequences of one or more instructions contained in memory 120. Such instructions may be read into memory 120 from another machine-readable medium, such as storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 170) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Client computing device 190 can be, for example, and without limitation, a desktop computer, laptop computer, or tablet computer. Client computing device 190 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer implemented method comprising:
   receiving a generalized endorsement key at a security module on a computing device, wherein the security module is a hardware component of the computing device, and wherein the generalized endorsement key is independent of characteristics of the computing device;
   automatically extending integrity measurements stored in one or more registers of the security module with information characterizing the computing device, wherein the integrity measurements are based on one or more software processes at the computing device;
   generating, by the security module, a digital signature;
   digitally signing the extended integrity measurements with the generated digital signature;
   generating, by the security module, a specialized endorsement credential based on a combination of the digitally signed extended integrity measurements, the generated digital signature used to sign the extended integrity measurements, and the generalized endorsement key, wherein the specialized endorsement credential is used to validate authenticity of the security module;
   providing, by the security module, in a request for an attestation identity credential, the specialized endorsement credential to a certificate authority; and
   receiving, by the security module, from the certificate authority, the attestation identity credential, the attestation identity credential indicating that the specialized endorsement credential is bound to an authentic security module.

2. The computer implemented method of claim 1, wherein the extending is performed at each hardware boot cycle of the computing device.

3. The computer implemented method of claim 1, wherein the security module is a trusted platform module (TPM).

4. The computer implemented method of claim 1, further comprising reading the information characterizing the computing device from secure storage associated with the security module.

5. The computer implemented method of claim 4, wherein the information characterizing the computing device includes a hardware identifier, wherein the hardware identifier is stored in the secure storage during manufacture of the computing device, wherein the hardware identifier identifies one or more of a model or class of the computing device.

6. The computer implemented method of claim 4, wherein access to the secure storage is based on one or more of a cryptographic key or a present operational state of the computing device.

7. The computer implemented method of claim 4, wherein the secure storage is a non-volatile random access memory (NVRAM) index.

8. A non-transitory machine-readable medium comprising instructions stored therein, which when executed by a processor, causes the processor to perform operations comprising:
   receiving, at a certificate authority, in a request for an attestation identity credential from a hardware security module on a computing device, a specialized endorsement credential,
   wherein the specialized endorsement credential is generated based on a combination of one or more digitally signed extended integrity measurements, a digital signature generated by the hardware security module that was used to sign the extended integrity measurements, and a generalized endorsement key that was provided by an endorsement authority;
   determining, based on the received specialized endorsement credential, whether the specialized endorsement credential and the one or more digitally signed extended integrity measurements in the specialized endorsement credential are valid;
   when the one or more digitally signed extended integrity measurements in the specialized endorsement credential are valid, generating the attestation identity credential;
   providing the generated attestation identity credential to the hardware security module to validate that the specialized endorsement credential is bound to an authentic security module; and
   when the one or more digitally signed extended integrity measurements in the specialized endorsement credential are invalid, proscribing generation of the attestation identity credential.

9. The non-transitory machine-readable medium of claim 8, wherein the determining comprises:
   comparing the one or more digitally signed extended integrity measurements to one or more valid extended integrity measurements.

10. The non-transitory machine-readable medium of claim 8, wherein the one or more digitally signed extended integrity measurements are extended at each hardware boot cycle of the computing device.

11. A system comprising:
    a memory comprising instructions; and
    a processor configured to execute the instructions to:
    receive a generalized endorsement key at a hardware security module on a computing device, wherein the generalized endorsement key is independent of characteristics of the computing device;
    modify integrity measurements stored in one or more registers of the hardware security module with information characterizing the computing device, wherein the integrity measurements are based on one or more software processes at the computing device;
    generate, by the hardware security module, a digital signature;
    digitally signing the modified integrity measurements with the generated digital signature;
    generate, by the hardware security module, a specialized endorsement credential as a combination of the digitally signed modified integrity measurements, the generated digital signature used to digitally sign the modified integrity measurements, and the generalized endorsement key,
    wherein the specialized endorsement credential is used to validate authenticity of the hardware security module;
    provide, by the hardware security module, in a request for an attestation identity credential, the specialized endorsement credential to a certificate authority; and
    receive, from the certificate authority, the attestation identity credential, the attestation identity credential indicating that the specialized endorsement credential is bound to an authentic security module.

12. The system of claim 11, wherein modifying the integrity measurements is performed at each hardware boot cycle of the computing device.

13. The system of claim 11, wherein the hardware security module is a trusted platform module (TPM).

14. The system of claim 11, further comprising reading the information characterizing the computing device from secure storage associated with the hardware security module.

15. The system of claim 14, wherein the information characterizing the computing device includes a hardware identifier, wherein the hardware identifier is stored in the secure storage during manufacture of the computing device, wherein the hardware identifier identifies one or more of a model or class of the computing device.

16. The system of claim 14, wherein the secure storage is a non-volatile random access memory (NVRAM) index.

17. The system of claim 14, wherein access to the secure storage is based on one or more of a cryptographic key or a present operational state of the computing device.

* * * * *